US008260359B2

(12) United States Patent
Melis et al.

(10) Patent No.: US 8,260,359 B2
(45) Date of Patent: Sep. 4, 2012

(54) VARIABLE DELAY TRANSMIT DIVERSITY

(75) Inventors: Bruno Melis, Turin (IT); Alfredo Ruscitto, Turin (IT); Paolo Semenzato, Rome (IT)

(73) Assignee: Telecom Italia S.p.A., Milan (IT)

( * ) Notice: Subject to any disclaimer, the term of this patent is extended or adjusted under 35 U.S.C. 154(b) by 906 days.

(21) Appl. No.: 11/664,836

(22) PCT Filed: Oct. 7, 2004

(86) PCT No.: PCT/EP2004/011204
§ 371 (c)(1),
(2), (4) Date: Apr. 6, 2007

(87) PCT Pub. No.: WO2006/037364
PCT Pub. Date: Apr. 13, 2006

(65) Prior Publication Data
US 2008/0188229 A1    Aug. 7, 2008

(51) Int. Cl.
*H04M 1/00* (2006.01)
(52) U.S. Cl. .................. 455/562.1; 455/506; 375/299
(58) Field of Classification Search ............... 455/101, 455/272–279.1, 450–454, 500–506, 550.1–562.1; 343/729–730; 375/259–267, 346–351
See application file for complete search history.

(56) References Cited

U.S. PATENT DOCUMENTS

| 5,574,989 | A | * | 11/1996 | Watson et al. ............... 455/101 |
| 5,781,541 | A | | 7/1998 | Schneider |
| 2001/0050963 | A1 | | 12/2001 | Yoneyama |
| 2003/0153322 | A1 | * | 8/2003 | Burke et al. ............... 455/450 |

FOREIGN PATENT DOCUMENTS

| EP | 0 840 394 A2 | | 5/1998 |
| EP | 1 164 718 | | 12/2001 |
| EP | 1164718 A2 | * | 12/2001 |
| GB | 2 365 281 | | 2/2002 |
| WO | WO 02/01732 | | 1/2002 |
| WO | WO 0201732 A2 | * | 1/2002 |
| WO | WO 02/19565 | | 3/2002 |
| WO | WO 0219565 A2 | * | 3/2002 |
| WO | WO 03/055097 | | 7/2003 |

OTHER PUBLICATIONS

Sang-Gyu Kim; Tae-Yeoul Yun; Kai Chang; Time-Delay Phase Shifter Controlled by Piezoelectric Transducer on Coplanar Waveguide; IEEE Microwave and Wireless Components Letters; vol. 1, Nr:13, pp. 19-20.*

(Continued)

*Primary Examiner* — Kamran Afshar
*Assistant Examiner* — Kashif Siddiqui
(74) *Attorney, Agent, or Firm* — Finnegan, Henderson, Farabow, Garrett & Dunner, L.L.P.

(57) ABSTRACT

A system for transmitting a signal via diversity antennas includes at least one delay element for generating at least one delayed replica of the signal subject to a given delay, the signal and the at least one delayed replica being adapted to be transmitted via the diversity antennas, and a control unit for the at least one delay element for varying the given delay, whereby the signal and the at least one delayed replica, transmitted via the diversity antennas, give rise to alternate constructive and destructive combinations therebetween.

45 Claims, 9 Drawing Sheets

OTHER PUBLICATIONS

Kim et al., "Time-Delay Phase Shifter Controlled by Piezoelectric Transducer on Coplanar Waveguide", IEEE Microwave and Wireless Components Letters, vol. 13, No. 1, pp. 19-20, (2003).

"3$^{rd}$ Generation Partnership Project; Technical Specification Group Radio Access Network; Physical Channels and Mapping of Transport Channels Onto Physical Channels (FDD), (Release 6)", 3GPP TS 25.211 V6.2.0, pp. 1-4, 18-19, (2004).

* cited by examiner

Fig_2

(a)

(b)

Fig_4

Fig_11

Fig_13

VARIABLE DELAY TRANSMIT DIVERSITY

CROSS REFERENCE TO RELATED APPLICATION

This application is a national phase application based on PCT/EP2004/011204, filed Oct. 7, 2004, the content of which is incorporated herein by reference.

FIELD OF THE INVENTION

The present invention relates to communication systems.

The invention was developed by paying specific attention to the possible application in mobile communication networks, and more specifically those mobile communication networks including radio base stations, repeaters and/or mobile terminals adapted to be equipped with multiple transmission antennas. Reference to this possible field of application of the invention is not however to be construed in a limiting sense of the scope of the invention.

DESCRIPTION OF THE RELATED ART

Data services are driving the demand for increased data rate and increased system capacity in communication systems and networks, including mobile communication networks. Unlike two-way voice services, that are essentially symmetric in their use of radio up and downlink, many advanced mobile services, such as web browsing or live video streaming, place greater demands on the radio downlink than on the uplink, with more traffic coming to the user (downlink) than from the user (uplink). Therefore, improvement of downlink capacity is one of the main challenges for the evolution of wireless systems. Moreover, many of the proposed data services are likely to be used in low mobility environments characterized by single-path propagation conditions. Poor performance due to prolonged deep fades of the channel is one of the problems associated with this scenario.

Channel coding in conjunction with interleaving is widely used to exploit temporal diversity. However, in very slow fading channels, as typically experimented by low mobility users, the interleaving required to spread long deeply faded blocks into decodable sequences is very long. The interleaving depth available in practice, on the other hand, is often rather limited because of strict requirements in terms of allowable service delay and usage of memory.

A possible technique used to address this problem is transmission antenna diversity, based on the utilization of two or more transmission antennas that introduce additional radio paths and thereby increase the available diversity level. Exploiting spatial diversity in systems with multiple antennas at the transmitter requires that the signal should be pre-processed or pre-coded prior to transmission. In fact, a system with N transmission antennas, where each antenna transmits the same signal with power P/N, provides exactly the same performance of a single antenna system with transmission power P. In order to exploit spatial diversity some kind of pre-processing or pre-coding of the transmitted signals is thus required.

The spacing among the multiple antennas also affects the degree of correlation among the propagation channels observed at the mobile phone. Large antenna spacing in the order of several wavelengths, leads to uncorrelated fading, which corresponds to maximum performance gain due to spatial diversity. In the case of third generation (3G) communication systems, for example, many kinds of transmitter diversity arrangements have been investigated. Some of these operate at the base-band level on each physical channel separately, and have been standardized by the 3GPP/3GPP2 groups (e.g. Space Time Transmit Diversity (STTD), Closed Loop Transmit Diversity (CLTD)).

Other transmission diversity techniques operate at radio frequency (RF) on the composite W-CDMA signal of the base station or repeater and therefore are typically not standardized. The relevance of these techniques is that they can be implemented as add-on modules to the existing equipments.

By way of direct explanation a first method used in the prior art to increase the diversity level over a communication channel involves the transmission of multiple delayed replicas of the same signal. This method is generally denoted as diversity transmission using a fixed delay. The transmitter is comprised of N antennas and each antenna transmits with power $P_j$ ($1 \leq j \leq N$). The sum of the various powers $P_j$, is equal to the power P transmitted by a single antenna system taken as reference $$P=P_1+P_2+P_3+\ldots+P_N$$

The other antennas in addition to the first antenna transmit the same signal with a fixed delay $T_j$ ($2 \leq j \leq N$). Delay is introduced by means of delay lines and the signal for each transmission antenna is provided to a RF amplifier (High Power Amplifier or HPA).

Figures 1, 3:
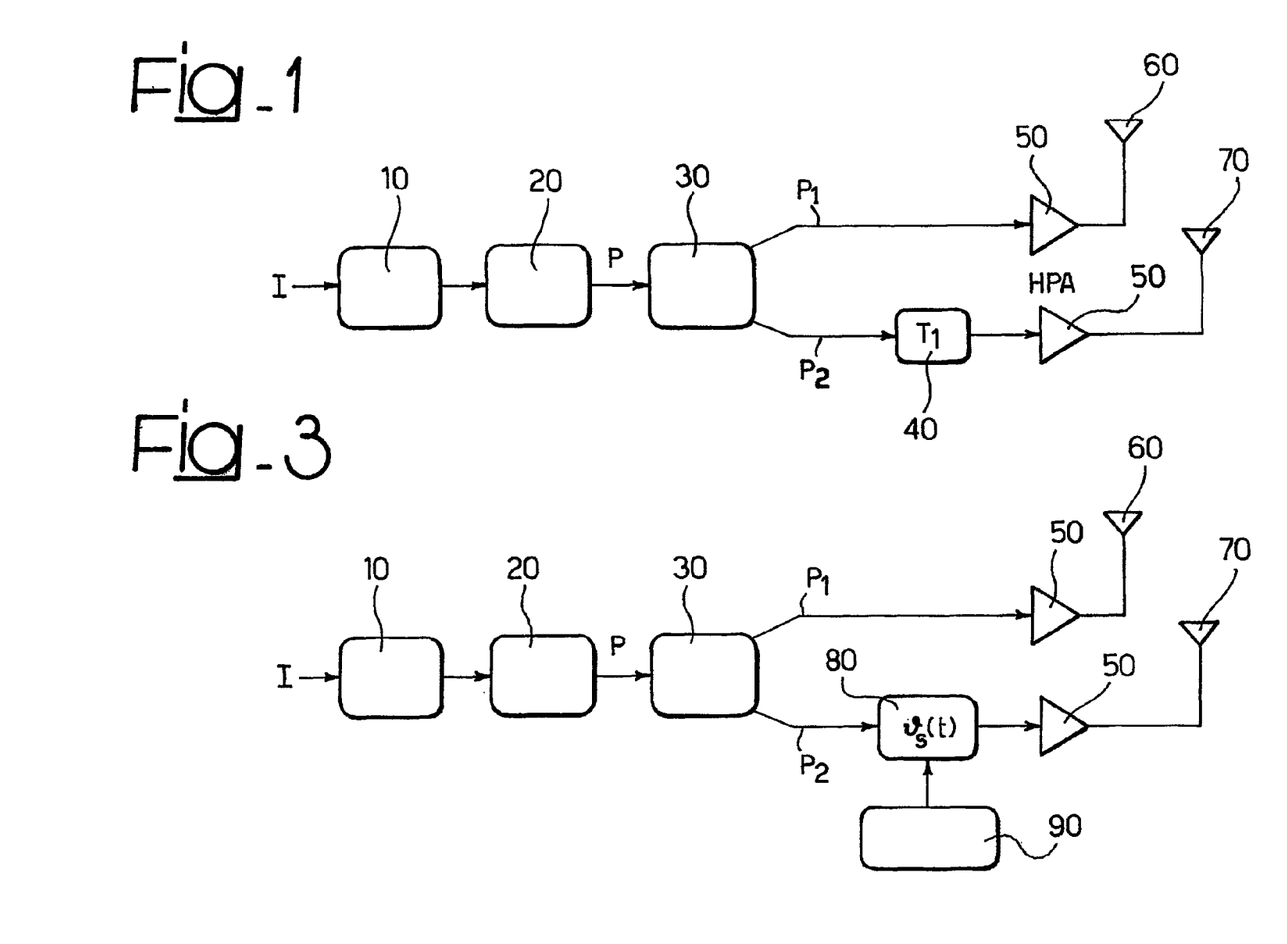

The block diagram of a diversity transmission apparatus using a fixed delay in case of N=2 is shown in FIG. 1.

Referring to FIG. 1 the input signal, designated I, is fed to a base-band block 10 that outputs the signal in its base-band version. The signal from block 10 is fed to an Intermediate Frequency/Radio Frequency (IF/RF) block 20 and then to a splitter block 30. Before the splitter block the power of the signal is equal to P. The block 30 outputs two signals with power levels equal to P1 and P2, respectively.

The first signal is fed to a High Power Amplifier HPA block 50, and then to a main antenna 60. The second signal is fed to a delay line block 40, with delay equal to $T_1$, and then to a High Power Amplifier HPA block 50. $T_1$ is fixed, and it is usually larger than the delay spread of the channel (in a range of some µs). Finally, the second signal is fed to a diversity antenna 70.

Figure 2:
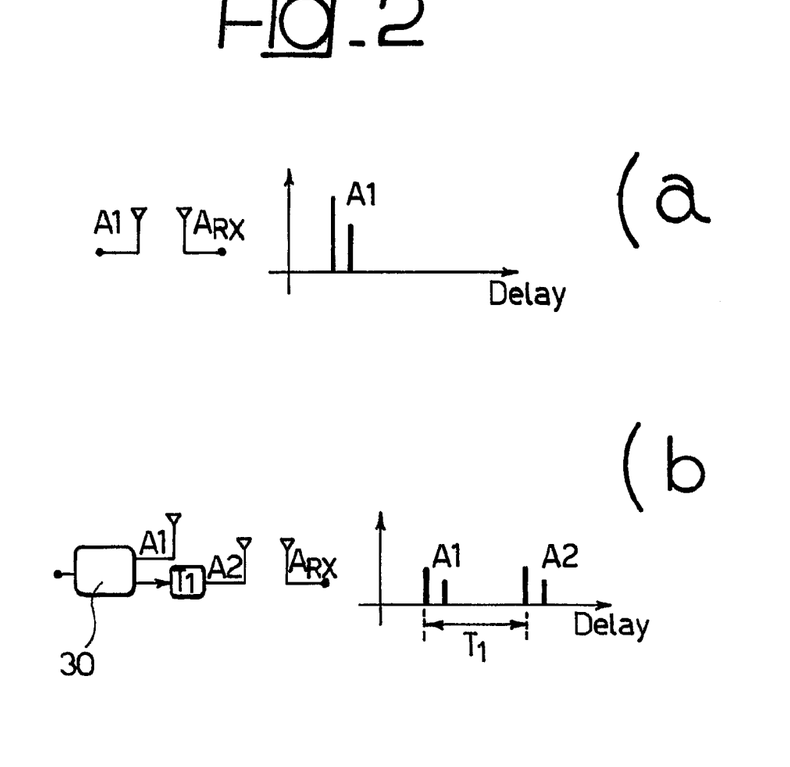

The delays $T_j$ are different for the additional antennas j=2, . . . , N. These delays are chosen in order to achieve sufficient time separation among the signal replicas and permit their coherent summation at the receiver. This kind of transmission scheme introduces additional radio paths, with respect to a single antenna system, and thereby increases the available diversity, as shown in FIG. 2 for a two-antenna system.

Specifically, FIG. 2a refers to a single antenna system comprising a single transmitter antenna and a single receiver antenna. FIG. 2b shows a diversity transmission system using a fixed delay comprising two transmitter antennas and a single receiver antenna.

In the specific case of a 3G system the delays $T_j$ have to be greater than the chip period but, at the same time, they must not exceed the User Equipment (UE) receiving window size, i.e. the memory buffer used to align the different multipath components of the received signal. Typically, the various delays $T_j$ are chosen in an interval ranging from 10 to 40 times the chip period, which corresponds to a delay in the range from 2.5 µs to about 10 µs for the W-CDMA version of the 3G standard.

A second known method used to increase diversity is Phase Sweeping Transmit Diversity (PSTD). In Phase Sweeping Transmit Diversity, the transmitted signal is processed exactly as in a system with no transmission diversity, up to the RF power amplifier stage.

The block diagram of a Phase Sweeping Transmit Diversity (PSTD) transmitter is shown in FIG. 3. In FIG. 3 references 10, 20, 30, 50, 60, and 70 designates blocks that implement the same functions of the correspondingly blocks in FIG. 1 in connection with an input signal I.

Upstream of the HPA amplifiers 50, the signal is split into two parts with power $P_1$ and $P_2$ respectively (in the typical configuration $P_1=P_2=P/2$). The first signal is amplified and transmitted via the main Antenna 60. A phase shifter block 80 applies a phase sweep to the second signal, which is a time variant phase rotated version of the second RF signal with respect to the first. The phase shifter block 80 is controlled by a phase control unit block 90. The second signal is then amplified by the HPA 50 and transmitted from the Diversity Antenna 70.

Figure 4:
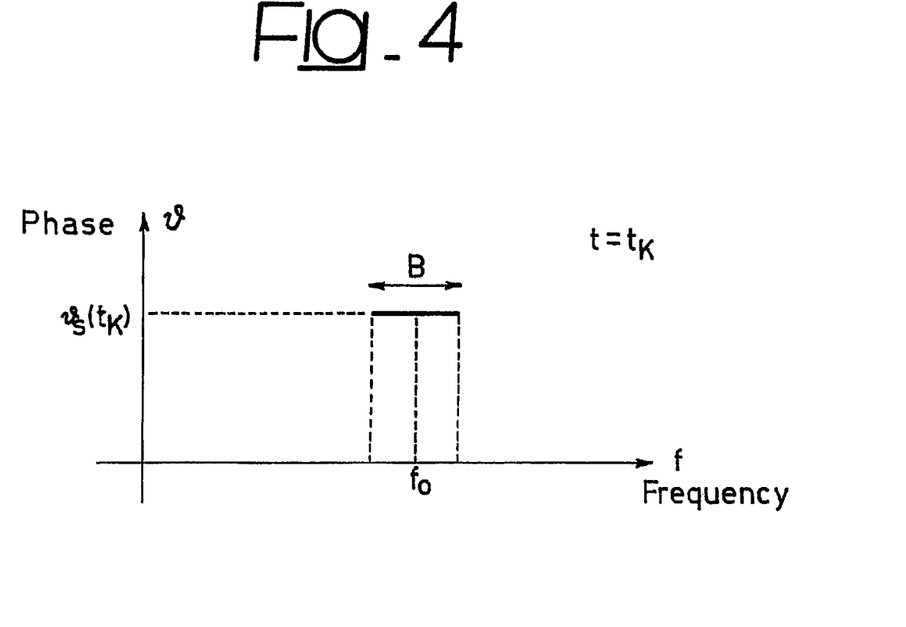

The introduction of a time variant phase rotation is equivalent to shifting the carrier frequency of the second signal. In fact, by denoting with $\vartheta_s(t)$ the phase sweep function, the instantaneous carrier frequency $f_s(t)$ of the signal transmitted by the second antenna 70 is equal to $$f_s(t) = f_0 + \frac{1}{2\pi} \frac{d\vartheta_s(t)}{dt}$$

where $f_0$ is the carrier frequency without PSTD. We also notice that, at a given time instant $t_k$, all the frequency components within the signal bandwidth B are phase rotated of the same quantity $\vartheta_s(t_k)$. Therefore, the phase shift curve as a function of frequency at a given time instant $t_k$ is a constant function as shown in FIG. 4.

A number of patent documents disclose arrangements that are essentially related to the two basic arrangements discussed in the foregoing.

For instance, U.S. Pat. No. 5,781,541 is exemplary of fixed delay techniques and describes an arrangement providing improved coverage and resistance to multipath fading in a CDMA system. The system uses multiple spatially-diverse antennas and a diversity transmission technique using a fixed delay. The spatially-diverse antennas emit identical CDMA-modulated signals towards a serving area at different times. Specifically, each CDMA-modulated signal sent from one antenna has a sufficient delay to avoid mutual interference with the signals sent from the other antennas. The delay assigned to each antenna is within a range greater than a chip interval, and less than or equal to a base station sequence offset between base stations. As a result, a subscriber station is able to separately demodulate the received CDMA-modulated signals from the different antennas using a Rake receiver.

Document WO-A2-03/055097 is exemplary of those techniques involving phase shifting and describes a method for providing Phase Shift Transmit Diversity (PSTD) in a wireless communication system. The base station phase shift modulates a first signal with a reference signal to produce a first phase-shift modulated signal. Further, the base station phase shift modulates a second signal with a different reference signal to produce a second phase shift modulated signal. The second phase shift is distinct from the first phase shift such that the second phase shift modulated signal is different relatively to the first phase shift modulated signal. Accordingly, the base station transmits the first phase-shift modulated signal via a first antenna and the second phase shift modulated signal via a second antenna to a plurality of mobile stations.

Document GB-A-2 365 281 describes the application of diversity transmission using a fixed delay combined with the Phase Shift Transmit Diversity (PSTD) in case of the GSM system. The downlink signal is transmitted by two antennas and the two signals have a mutual time delay and phase difference. The time delay is fixed and is chosen such that a user equipment (UE) including an equalizer can demodulate the aggregate signal received from the two transmission antennas. Preferably, the maximum delay equals the maximum allowable delay spread in accordance with the GSM standard. The phase difference between the two signal changes periodically, for example between successive time slots.

Document WO-A-02/19565 presents some methods and a related apparatus wherein diversity transmission using a fixed delay and Phase Shift Transmit Diversity (PSTD) techniques are combined. An input symbol stream is offset in time by M symbols periods to generate an offset symbol stream. The original input symbol stream is then transmitted on a first set of N antennas and the offset input symbol stream is transmitted on a second set of N antennas. The Phase Shift Transmit Diversity (PSTD) technique is applied on each set of N antennas in order to further increase the diversity level. The phase shifting of PSTD may be either a continuous phase sweep or discrete phase hopping in every burst period.

The cost and size of a delay line of several microseconds, operating on an analog signal in the GHz range penalize those arrangements that apply a diversity transmission with a fixed delay. The delay line can be implemented for example by means of a RF cable and this solution has several drawbacks such as cost, size and transmission losses of the cable.

Moreover, in case of slow moving or still users it may occur that both the received signal replicas are attenuated thus producing a prolonged deep fade at the receiver. If the communication system utilizes a closed loop power control in order to keep a constant SNIR (Signal-to-Noise-plus-Interference-Ratio) at the receiver, the deep fade is compensated by increasing the transmitted power at the base station. However, a prolonged increase of the transmitted power corresponds to an increase of the interference level in the system and thus a reduction of the system capacity.

Conversely, a basic drawback of those techniques involving phase shifting lies in that, whenever a signal other than a purely sinusoidal signal is involved, phase shifting is a rather complex process to implement. The practical unavailability of simple arrangements adapted to implement phase shifting of a generic signal practically outweighs the potential advantages of such techniques.

OBJECT AND SUMMARY OF THE INVENTION

In view of the foregoing, the need is felt for an efficient arrangement for countering the effect of fading and/or multipath in communication networks, and more specifically in mobile communication networks including radio base stations, repeaters and/or mobile terminals adapted to be equipped with multiple transmission antennas. This with the basic aim of increasing the data rate and improving the downlink capacity and coverage, while dispensing with the intrinsic limitations of the prior art arrangements considered in the foregoing.

The object of the invention is to provide a response to such a need.

According to the present invention, that object is achieved by means of a method having the features set forth in the claims that follow, such claims constituting an integral part of the disclosure of this application. The invention also relates to a corresponding apparatus, a related network and communication equipment as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the invention is thus a method of transmitting a signal including the steps of:

generating at least one replica of said signal subject to a given delay, and transmitting said signal and said at least one replica of said signal subject to a given delay via diversity antennas; the method includes the step of varying said given delay, whereby said signal and said at least one replica of said signal subject to said varying delay and transmitted via diversity antennas give rise to alternate constructive and destructive combinations therebetween.

The invention is applicable to any kind of communication equipment adapted to be included in a communication network such as a mobile communication network. While particularly adapted to be applied in communication equipment such as a radio base station or a repeater in a mobile communication network, the invention may also be applied in other communication equipment of the mobile type (e.g. mobile user terminals).

BRIEF DESCRIPTION OF THE ANNEXED DRAWINGS

The invention will now be described, by way of example only, with reference to the enclosed figures of drawing, wherein:

FIGS. 1 to 4 have already been described in the foregoing;

DETAILED DESCRIPTION OF PREFERRED EMBODIMENTS OF THE INVENTION

The arrangement described herein implements a diversity technique, operating at RF and therefore independent from a particular wireless system, adapted for a simple implementation, and providing significant performance improvement in low mobility scenarios. In brief, the arrangement described herein provides a new method to exploit the diversity offered by two or multiple transmission antennas. This arrangement can be designated as a dynamic delay diversity arrangement in that it is based on the introduction of a variable delay on the signal transmitted by the additional antennas. The transmitted signal is processed exactly as in a system with no transmission diversity, up to the RF power amplifiers.

In case of a system with N=2 transmission antennas the signal is split into two parts with power $P_1$ and $P_2$ respectively (in the typical configuration $P_1=P_2=P/2$). The first signal is amplified and transmitted from the main antenna, while a time variant delay is applied to the second signal.

The delay varies from zero to about the period of the carrier frequency $T_0=1/f_0$ with a given law that can be e.g. linear, sinusoidal, etc. The second signal is then amplified by a high power amplifier (HPA) and transmitted from a diversity antenna.

Figures 5, 6:
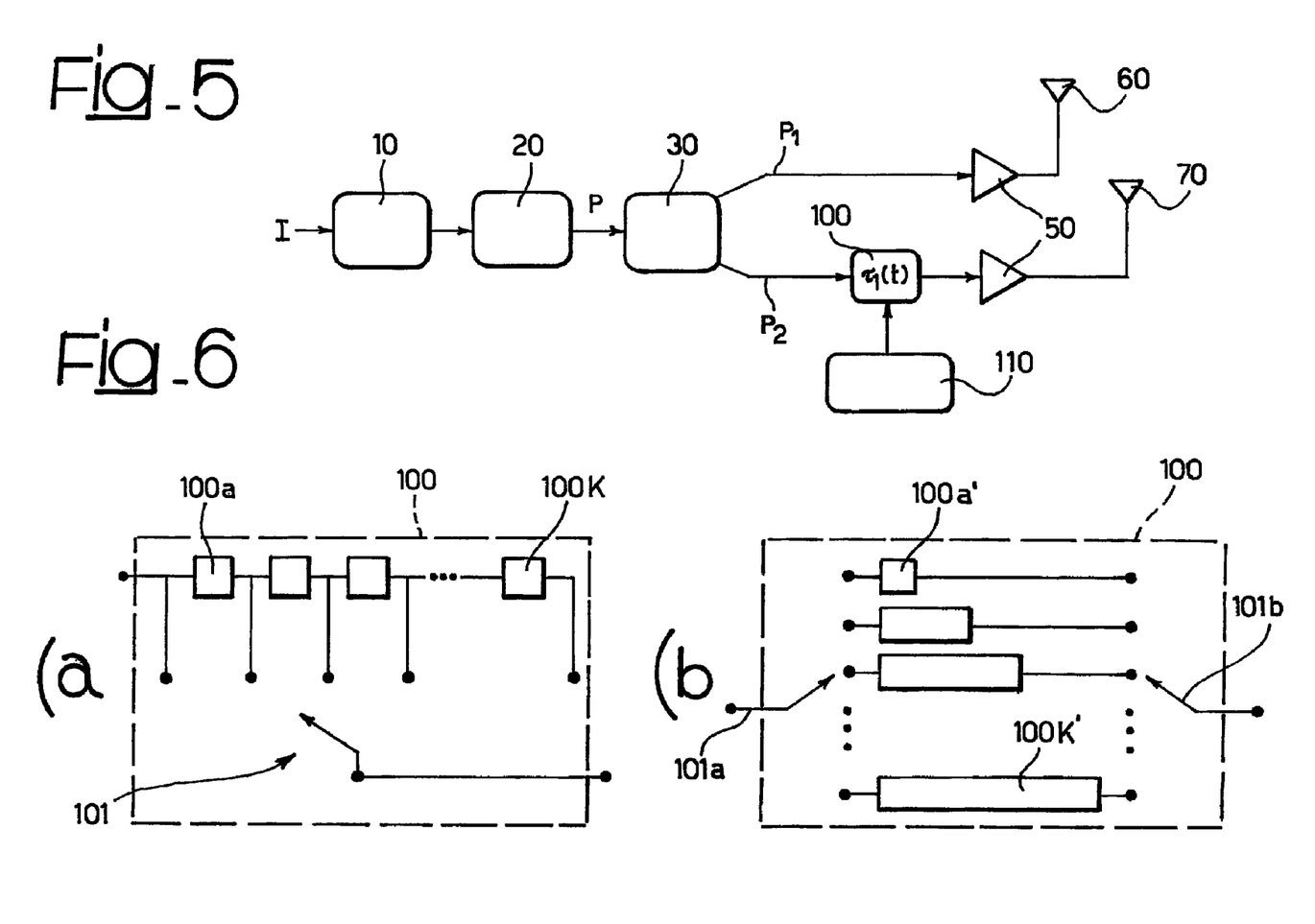
FIG. 5 shows a basic block diagram of a dynamic delay diversity transmitter as described herein.
FIG. 6, includes two parts designated a) and b), respectively, that show exemplary implementations of delay lines within the framework of the arrangement described herein.

The block diagram of a corresponding dynamic delay diversity transmitter is illustrated in FIG. 5. In FIG. 5 references 10, 20, 30, 50, 60, and 70 again designate blocks that implements the same functions of the corresponding blocks shown in FIGS. 1 and 3 in connection with an input signal I. Consequently, these blocks will not be described again here.

The variable delay is introduced by means of a delay line block 100 controlled by a delay control unit (DCU) 110 that controls the law of variation of the delay $\tau_1(t)$ over time. Typically, $\tau_1(t)$ is variable in the range of few nanoseconds (ns).

FIG. 6a shows a first exemplary implementation of the delay line 100 in the form of a tapped delay line (TDL), namely as the cascade of elementary delay units 100a, ..., 100k. Each such delay unit (e.g. a transmission line stub) may generate a delay of, say, 0.1 ns.

The various tap points in the line come down to a RF switch 101. The switch 101 is controlled by the delay control unit (DCU) 110 making it possible to select a particular tap of the tapped delay line and therefore a given value of the delay produced by the block 100. Changing the position of the switch 101 makes it possible to change the value of the delay.

Stated otherwise, in the exemplary embodiment shown a varying delay is produced by providing a cascade of elementary delay units 100a, ..., 100k and by selectively varying, via the switch 101, the number of elementary delay units included in the cascade.

FIG. 6b shows a second exemplary implementation of the delay line 100 in the form of a plurality of delay elements 100a', ..., 100k' (these may again be comprised of transmission line stubs) each producing a respective delay of e.g. 0.1 ns., 0.2 ns., 0.3 ns., and so on.

Two switches 101a and 101b are controlled in a coordinated manner by the delay control unit (DCU) 110 making it possible to select a particular delay element 100a', ..., 100k' and therefore a given value of the delay produced by the block 100. Changing the position of the switches 101a and 101b makes it possible to change the value of the delay.

Typically, this delay is varied in the range between tenths of nanoseconds (ns) and units of nanoseconds (ns).

It will be appreciated that such a delay does not introduce any phase distortion on the transmitted signal. In fact, Fourier analysis shows that applying a delay to a signal having a given frequency spectrum is equivalent to applying a linear phase shift in the frequency domain, that is a phase shift that varies as a linear function of frequency. Therefore, at a given time instant $t_k$, the frequency components within the signal bandwidth B are phase rotated of a different quantity equal to $\vartheta_s(f)=2\pi f\tau(t_k)$, where $\tau(t_k)$ is the delay introduced at the time instant $t_k$.

Figure 7:
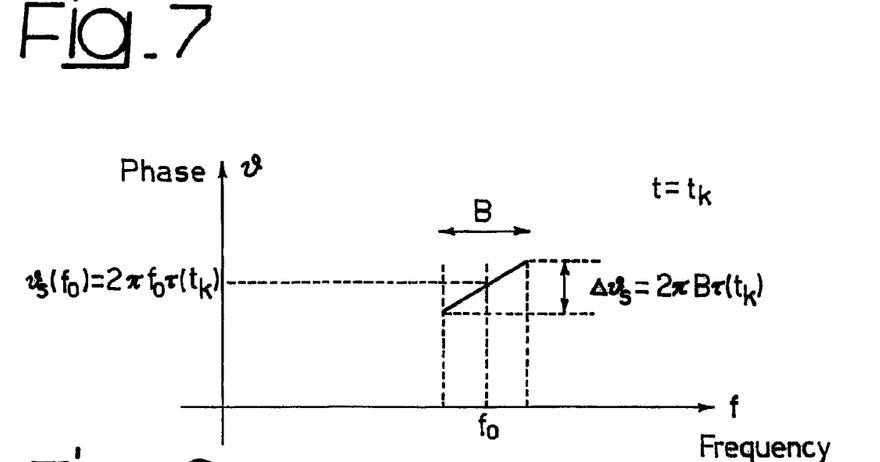
FIG. 7 shows a linear function phase shift curve.

No phase distortion is introduced. In fact, the phase shift curve as a function of frequency at a given time instant $t_k$ is a linear function as shown in FIG. 7.

In that respect, it will be appreciated that applying a time delay is equivalent to applying a phase shift—only—in the case of a single frequency (e.g. a purely sinusoidal) signal, whose power spectrum is concentrated at a single frequency and is represented by a Dirac function. Conversely, when a multifrequency signal, i.e. a signal having a power spectrum covering plural frequencies is considered, applying a time delay is—not—equivalent to applying a phase shift. Applying a time delay to such a multifrequency signal is equivalent to applying a linear phase shift in the frequency domain, that is a phase shift that varies as a linear function of frequency. Conversely, applying a phase shift to such a multifrequency signal is equivalent to applying a phase shift that is constant in the frequency domain, that is a phase shift that does not vary as a function of frequency.

Figure 8:
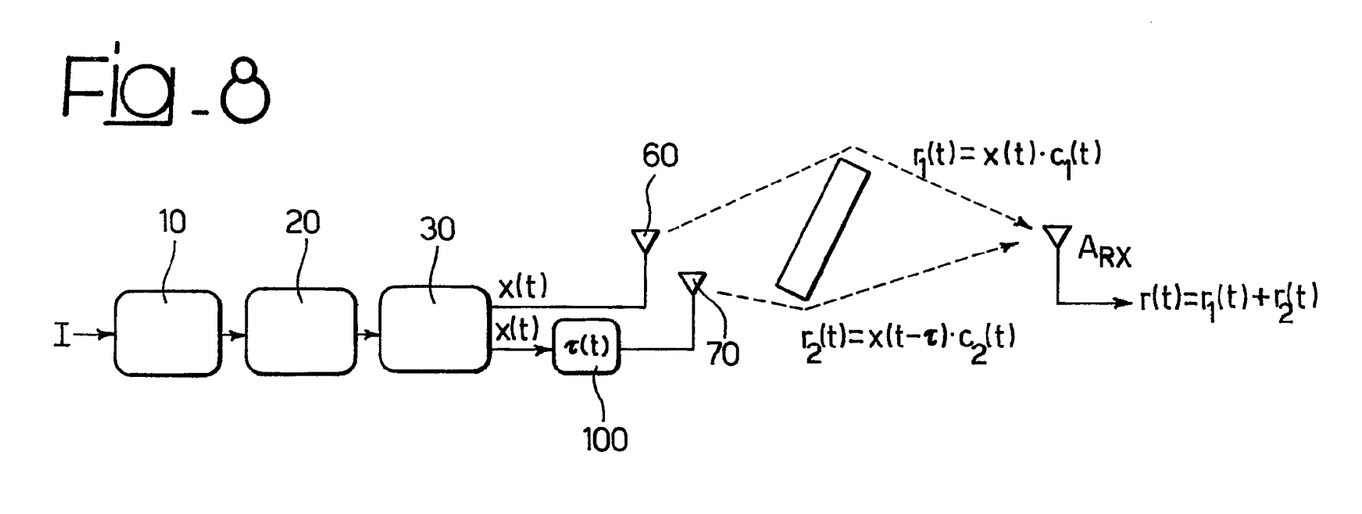
FIGS. 8, 8a, and 8b show the rotation of the phasor of the signal of the second antenna in a two-antenna system.

The effect of the variable delay can be explained from the propagation point of view as schematically shown in FIG. 8.

By referring, for the sake of simplicity, to the case of two transmission antennas, for each path or echo, the received signal is composed by the sum of two contributions each corresponding to the signal as transmitted by one of the two transmission antennas. Each of these two signal contributions typically has an amplitude with a Rayleigh distribution and random phase with uniform distribution. The two signals arrive at the mobile antenna at about the same time instant (i.e. they are not time resolvable) and combine according to a phasor addition.

This combination may be destructive if the two signals have about the same amplitude and a phase difference in the vicinity of 180 degrees. Moreover, when the receiving (mobile) terminal is moving very slowly or it is stationary, this destructive combination may cause long, deep fades with a corresponding large burst of errors.

By introducing the variable delay the phasor of the signal corresponding to the second antenna is forced to rotate with respect to the first as shown in FIG. 8.

The overall received signal for a given path is:

$$r(t)=r_1(t)+r_2(t)$$

where $r_1(t)=x(t) c_1(t)$ is the contribution from the first transmission antenna, and $r_2(t)=x(t-\tau) c_2(t)$ is the contribution from the second transmission antenna.

Figure 8A:
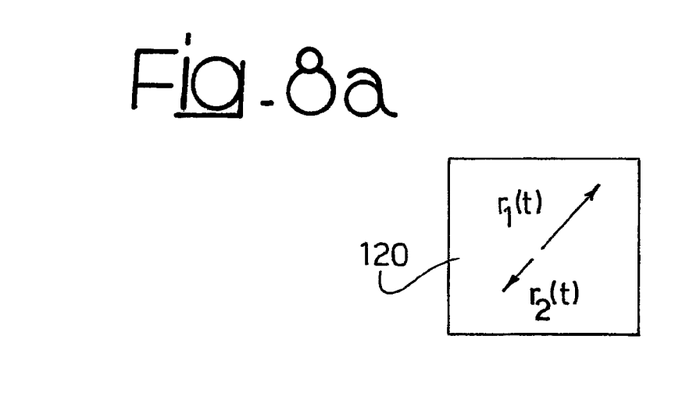
Figure 8B:
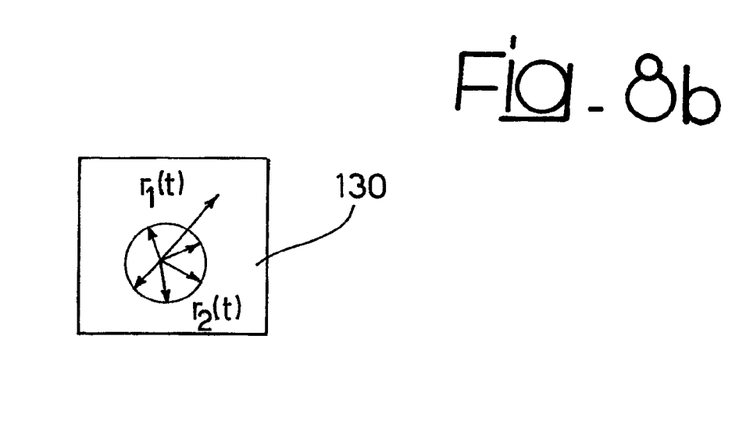

In FIG. 8a reference 120 designates the case of two transmitting antennas with fixed delay on the second antenna, while in FIG. 8b reference 130 designates the case of dynamic delay diversity with two antennas.

In either case, the dynamic delay diversity causes an oscillation in the received signal power. The received signal power/amplitude depends on the relative strengths of the two received signals. When one signal is much stronger than the other, the variation is small, and the received signal power is approximately equal to the power of the stronger signal. When the two signals are comparable in strength, however, the variation in the received power ranges from close to zero (destructive combination) to a value four times above the level of each of the individual signals (constructive combination).

In fact, by denoting with A the amplitude of each signal received from one of the two transmission antennas, the combined signal in case of coherent addition has an amplitude $A_c$ equal to:

$$A_c=2 \cdot A$$

This corresponds to a power four times above the level of each individual signals or, by using logarithmic units, +6 dB above the level of each individual signal.

The explanation above can be extended to the case of N transmission antennas, with N>2. In such a case the received power level varies from close to zero (destructive combining) to a value $N^2$ times above the level of each of the individual signals (constructive combining).

Figure 9:
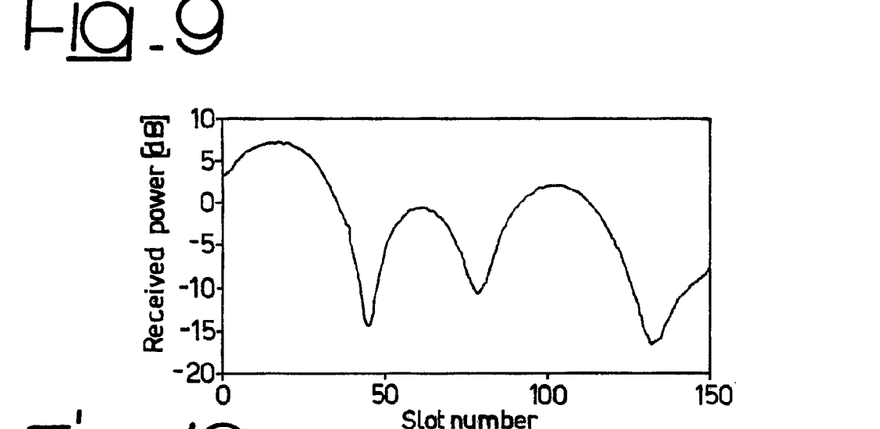
FIGS. 9 and 10 show, by way of direct comparison, the received power level in two otherwise equivalent arrangements without and with transmission diversity.
Figure 10:
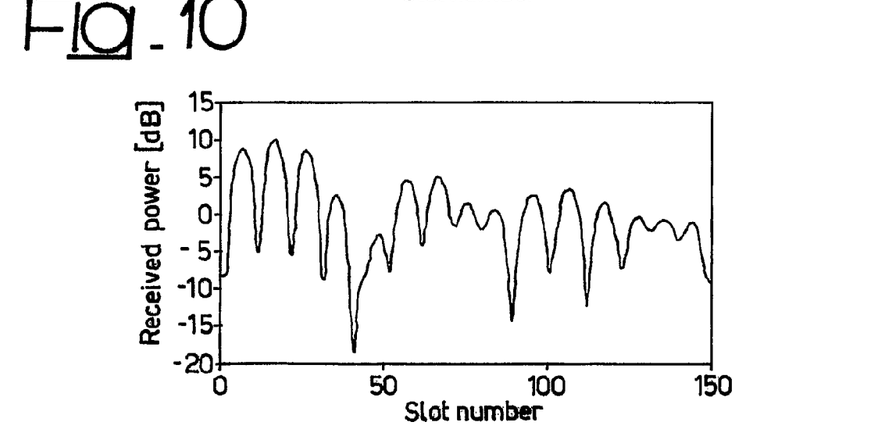

The effect of the variable delay on the received power level is shown in FIG. 9 and FIG. 10.

FIG. 9 shows the received power level without transmission diversity. FIG. 10 shows the received power when using dynamic delay diversity at the transmitter. In both diagrams, for the particular case of the W-CDMA system, the abscissa scale indicates the number of time slots over which the received power is observed.

In both cases, the user terminal speed is equal to 10 km/h. In the presence of dynamic delay diversity the signal fades at a faster rate than the signal in the absence of transmission diversity. This is due to the periodic alternation of constructive and destructive combination. The variable delay generates an artificial fast fading even in very slowly fading channels and thus improves performance of wireless systems employing channel encoding technique with a given interleaver length: in fact, in the presence of a faster fading the interleaver has more opportunity to spread the errors over the coded frame. The result of applying dynamic delay diversity is therefore to improve the link performance and reduce the downlink power requirement for the same value of quality of service (QoS) measured for instance in terms of Block Error Rate (BLER).

In general, the variable delay functions $\tau_1(t)$ is chosen such that the delay change over a symbol period is small compared to the period of the carrier. In the particular case of a CDMA system, for example, the previous assumption ensures that there is a minimal energy loss in the sum (integrate) and dump operation that are performed at the receiver. If we denote with $T_c$ the chip period and with SF the spreading factor, the symbol period $T_s$ before the spreading operation is equal to $$T_s=SF \cdot T_c$$

Therefore, in order to have a minimal energy loss in the sum and dump operation it is necessary to satisfy the condition $$|\tau_1(t_k+T_s)-\tau_1(t_k)|<<T_0 \ \forall \ t_k \qquad (1)$$

where $t_k$ is a generic time instant and $T_0$ is the period of the carrier (for example $T_0$=0.5 ns for a 2 GHz carrier frequency). The delay function $\tau_1(t)$ is then chosen in order to satisfy the condition (1) but also in order to introduce a sufficient variability of the fading process within the interleaving span. A possible rule of thumb for determining the periodicity of the delay function $\tau_1(t)$ is to choose a value which is comparable to value of the interleaving length. For example, in case of the W-CDMA version of the 3G standard which has an interleaving span ranging from 10 to 80 ms, a possible choice of the period of the delay functions is in the order of 10÷20 ms.

Figure 11:
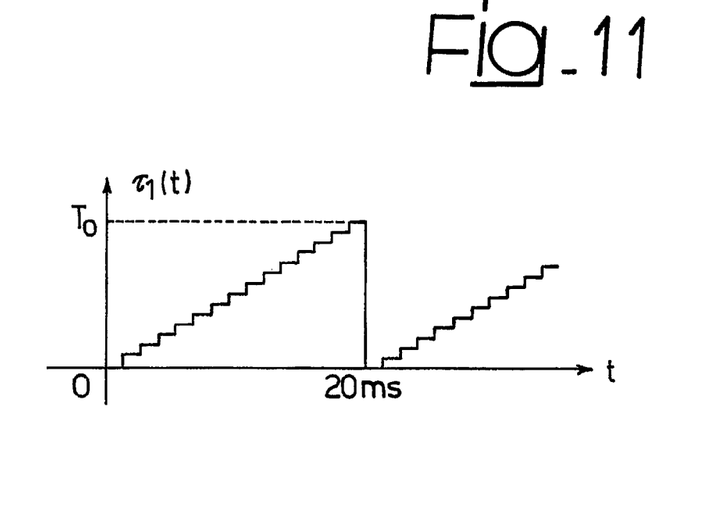
FIG. 11 shows an example of delay function applied to the second transmission antenna in a two-antenna system.

FIG. 11 shows an example of the delay function $\tau_1(t)$, applied at the second transmission antenna. In this case the delay is caused to vary (e.g., by acting on the switch 101 of FIG. 6) in discrete steps between zero and $T_0$. Those of skill in the art will promptly appreciate that such a law is a purely exemplary one and that notionally—any kind of law of delay variation—can be implemented with the arrangement shown.

As an alternative to varying the delay in discrete steps as shown in connection with the exemplary embodiments of FIG. 6, in other possible implementations of the delay line 100 the delay is caused to vary continuously. A possible implementation of the delay line 100 with continuous variation of the introduced delay can be found in the article "Time Delay Phase Shifter Controlled by Piezoelectric Transducer on Coplanar Waveguide", IEEE Microwave and Wireless Components Letters, Vol. 13, No. 1, pag. 19-20, January 2003. In particular, the continuous delay line 100 may be implemented by inserting on a coplanar waveguide a piezoelectric transducer whose perturbations vary the effective dielectric constant of the coplanar waveguide.

An important advantage of the dynamic delay diversity technique described herein lies in that the delay to be introduced on the transmitted signal is significantly lower than the delay required by the diversity transmission using a fixed delay. In fact, the delay required by the dynamic delay diversity technique described herein is in the order of few nanoseconds as compared to a delay of some microseconds required by the diversity transmission technique using a fixed delay. The size, cost and complexity of the delay line are reduced in case of the dynamic delay diversity technique described herein.

The embodiment shown in FIG. 5 is a preferred embodiment of the solution described herein for a communication system equipped with two transmission antennas: this may represent the typical configuration of a radio base station or a repeater for wireless mobile communications. A base station equipment includes two main parts: the baseband processing unit 10 that performs the digital operations at symbol and chip level and the IF/RF processing unit 20 that performs the digital to analog conversion, filtering and frequency up-conversion to the Radio Frequency (RF). In case of a repeater the base-band unit is not present as the signal processing is performed only at analog level, for example at a suitable intermediate frequency (IF).

As already indicated, in order to provide the dynamic delay diversity, the RF signal is split in two parts by means of a signal splitter 30. The signal, with power $P_1$ and $P_2$, is then available at each output port of the signal splitter respectively (in the typical configuration $P_1=P_2=P/2$). The first output of the signal splitter is fed to a first high power amplifier (HPA) 50 to be transmitted by the main antenna 60. The second output from the signal splitter 30 is provided to the programmable delay line 100 that introduces a time variant delay on the signal. The delayed signal is fed to a second high power amplifier (HPA) 50 to be transmitted by the diversity antenna 70.

In the exemplary embodiments of the delay line 100 shown in FIG. 6, the delay variation is controlled by the delay control unit that determines the minimum and maximum value of the delay and the variation of such delay between these two limits. The delay varies typically from zero to about the period of the carrier frequency $T_0=1/f_0$ with a particular law that can be for example linear, sinusoidal, etc. An example of delay function $\tau_1(t)$ applied to the second transmission antenna is shown in FIG. 11, in case of delay that varies with discrete steps between zero and $T_0$.

Those of skill in the art will promptly appreciate that the effectiveness of the arrangement shown is retained if no HPA(s) is/are used, or if a single HPA, placed "upstream" of the splitter 30, is used.

There are in fact cases (e.g. pico/micro cells) where no HPA is required in view of the limited coverage range.

Using a single HPA placed before the splitter 30 is advantageous in terms of cost. This choice may however impose strict requirements on the insertion loss and linearity of the delay line 100. It will be appreciated that the solution shown in FIG. 6 permits the implementation of a delay line with minimum insertion loss and good linearity.

Figure 12:
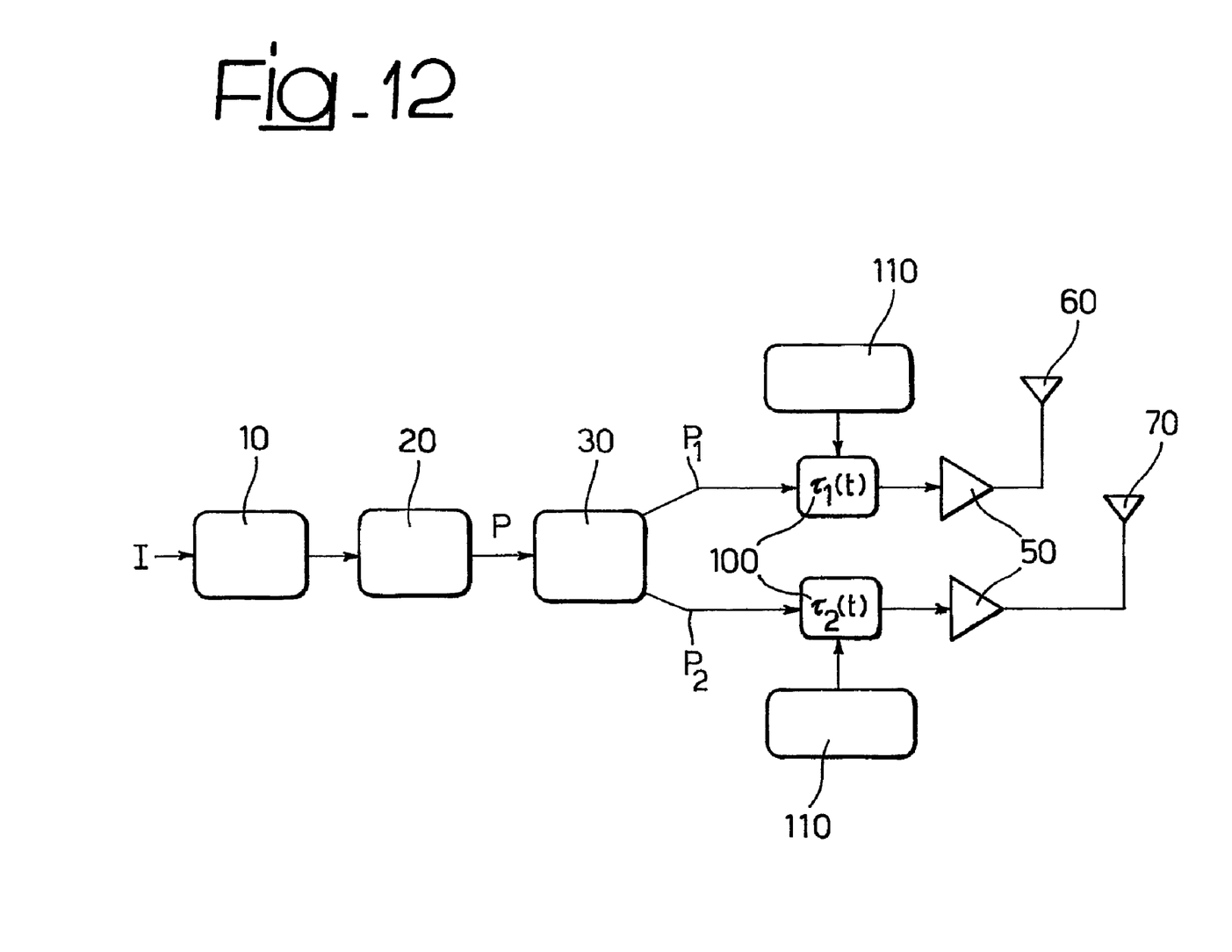
FIG. 12 shows an arrangement where a variable delay is introduced on both transmission antennas in a two-antenna system.
Figure 13:
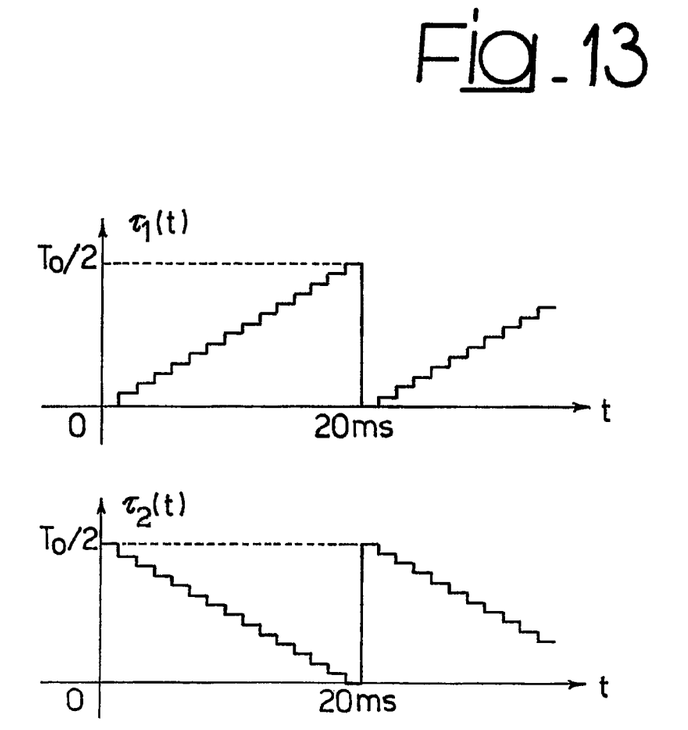
FIG. 13 shows an example of delay functions applied to two transmission antennas in a two-antenna system.

In a further alternative embodiment, variable delays 100 may be associated with both transmission antennas, as shown in FIG. 12. In that case, the delay function $\tau_2(t)$ of the diversity antenna 70 is different from the delay function $\tau_1(t)$ of the main antenna 60. In that way, alternate constructive and destructive combinations between the two transmitted signals are obtained at the receiving antenna, as shown in FIG. 8. Exemplary delay functions $\tau_1(t)$ and $\tau_2(t)$ adapted to be applied to the two transmission antennas in the arrangement of FIG. 12 are shown in FIG. 13.

The architecture described in FIG. 12 can be extended to a system including N antennas (where N>2) and N delay functions $\tau_j(t)$ (with $1 \leq j \leq N$), different among them, applied to the respective transmission antenna.

Figure 14:
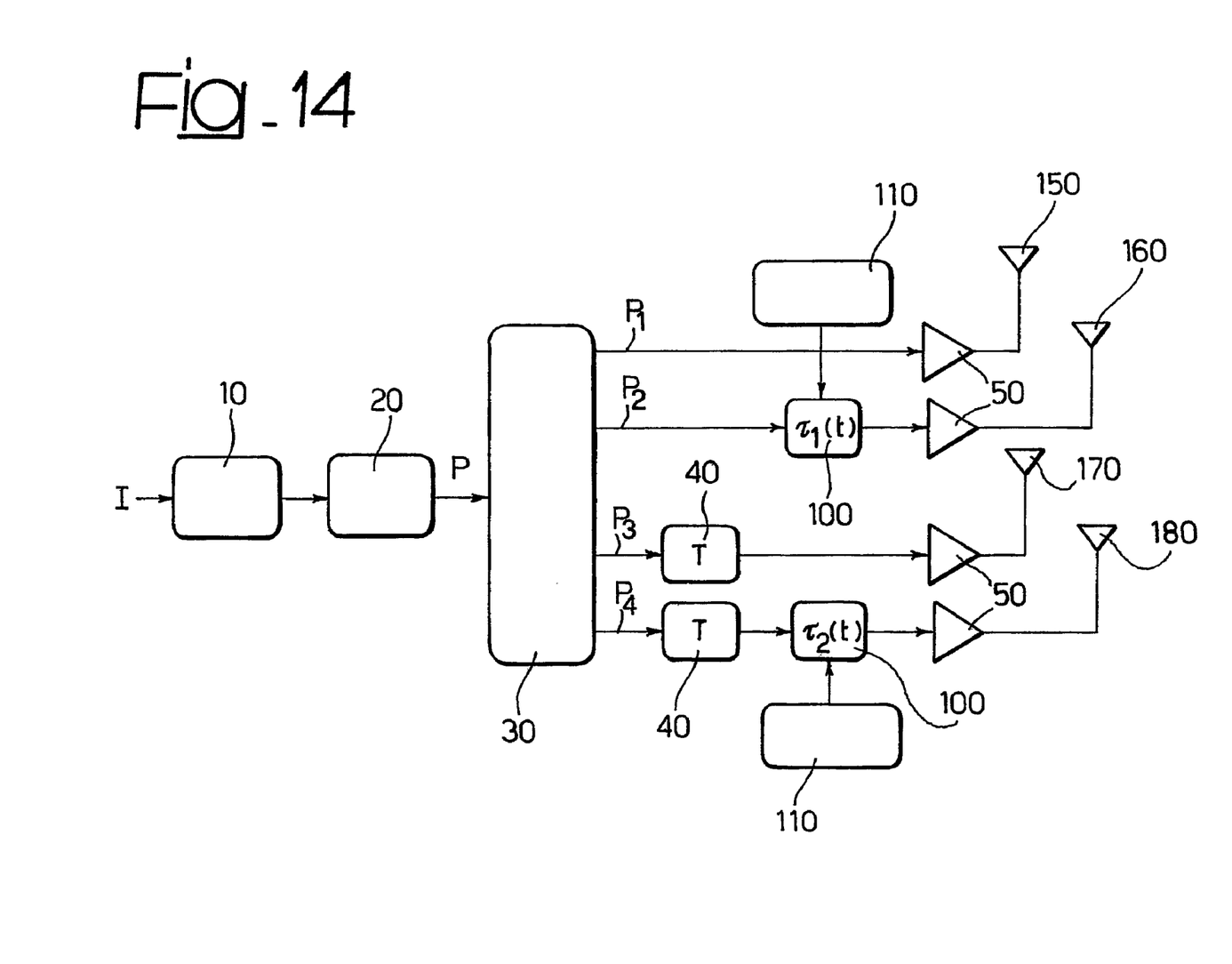
FIG. 14 shows an arrangement where diversity transmission using a fixed delay and dynamic delay diversity are combined.

A still further alternative embodiment is shown in FIG. 14. There, diversity transmission using a fixed delay and dynamic delay diversity are combined. The RF signal is split in four paths by means of a signal splitter block 30. Two of these paths, with powers $P_1$ and $P_2$, respectively, are subject to dynamic delay diversity processing (by means of a first delay line 100) as previously described and transmitted via two separate antennas 150 and 160. The two other paths, with powers $P_3$ and $P_4$, respectively, are first subject to fixed delays T in delay blocks 40, and then to dynamic delay diversity processing (by means of a second delay line 100). The fixed delays T are generally larger than the chip period and the channel delay spread in order to achieve sufficient time separation of the signal replicas permitting their coherent summation at the receiver. The signals over these two latter paths are transmitted via two other separate antennas 170 and 180. The system is then composed by four transmission antennas. The variable delay functions $\tau_1(t)$ and $\tau_2(t)$ applied to each antenna pair are in general different. However, in the case of the W-CDMA system, for example, the two functions $\tau_1(t)$ and $\tau_2(t)$ can be identical if the fixed delay T is greater than the chip period: in such a case the fixed delay produces separate echoes that can be time resolved at the receiver for example by using a Rake receiver.

Figure 15:
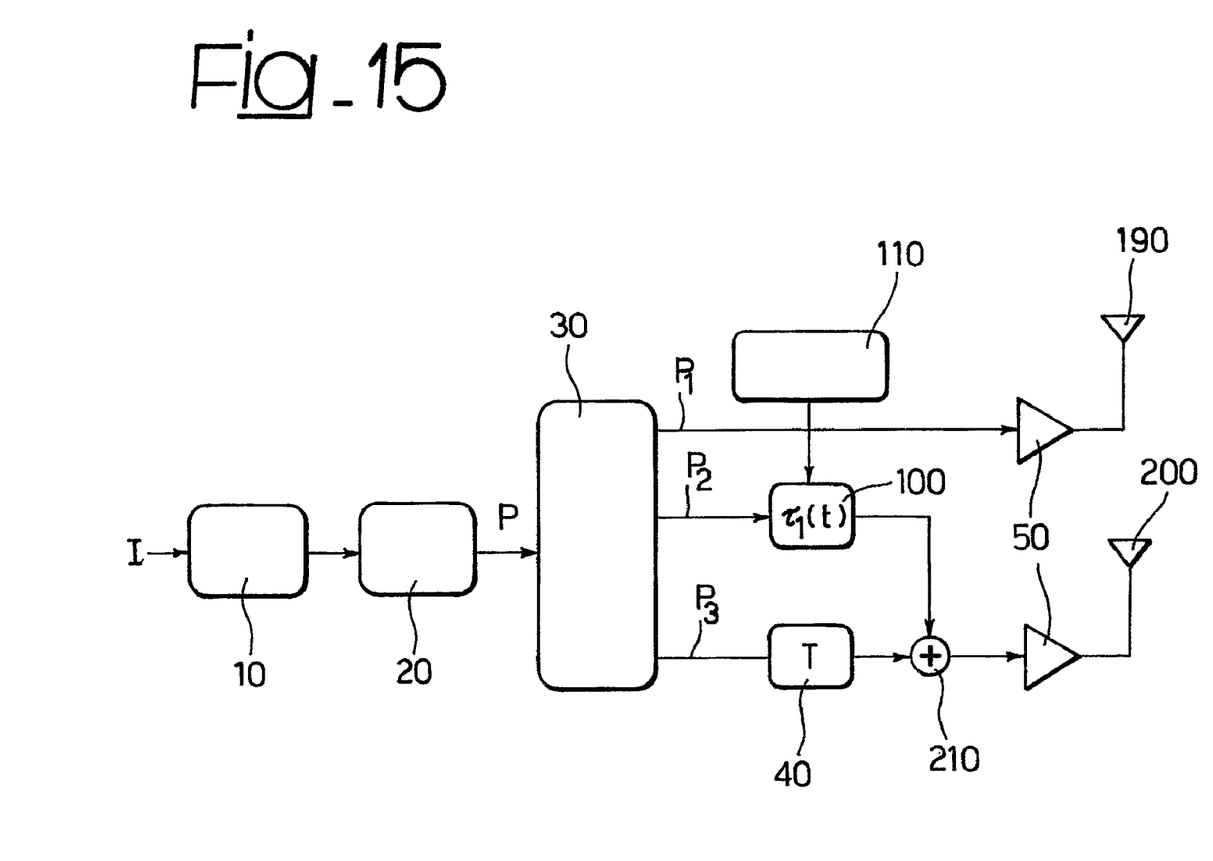
FIG. 15 shows an arrangement including two transmission antennas, where diversity transmission using a fixed delay and dynamic delay diversity are combined.

Still another alternative embodiment that combines diversity transmission using a fixed delay and dynamic delay diversity, by using only two transmission antennas, is shown in FIG. 15. The RF signal is first split at a splitter 30 in three parts with powers $P_1$, $P_2$ and $P_3$ (in a typical configuration $P_1=P_2=P/4$ and $P_3=P/2$). The first signal, with power $P_1$, is transmitted by the first antenna 190 without being subject to further delay processing. The second signal with power $P_2$, is subject to a variable delay $\tau_1(t)$ according to the dynamic delay diversity technique described herein. The third signal, with power $P_3$, is subject to a fixed delay T, in a delay block 40, to be then combined, by means of a combiner node 210, with the second signal. The combined signal is subsequently transmitted via the second antenna 200.

In brief the arrangements shown in FIGS. 14 and 15 are based on the concept of:

generating at least one first delayed replica of the signal subject to a varying delay ($\tau_1(t)$ and, possibly, $\tau_2(t)$), generating at least one second delayed replica of the signal subject to a fixed delay (i.e. T), and transmitting the signal together with the delayed replicas via diversity antennas.

In the specific case of the arrangement shown in FIG. 14, at least one third delayed replica of the signal is generated which is subject to a fixed delay (i.e. T) plus a further varying delay (i.e. $\tau_2(t)$). The signal and the first, second and third delayed replicas are then transmitted via respective diversity antennas 150, 160, 170, and 180.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method of transmitting a signal in a wireless telecommunication system which provides communication services to a plurality of terminals, the method comprising:
    generating at least one replica of said signal;
    introducing time variable dynamic delay on said at least one replica;
    transmitting said signal and said at least one delayed replica via diversity antennas; and
    varying, during transmission of the signal, said time variable dynamic delay independently of said transmitted signal and said transmitted at least one delayed replica, according to a varying delay function, whereby said signal and said at least one delayed replica transmitted via said diversity antennas, give rise to alternate constructive and destructive combinations therebetween.

2. The method of claim 1, further comprising:
    subjecting said signal to splitting to generate at least one replica thereof; and
    subjecting said at least one replica to a variable delay to produce said at least one delayed replica.

3. The method of claim 1, comprising generating one delayed replica of said signal.

4. The method of claim 1, further comprising generating a plurality of delayed replicas of said signal, each replica of said plurality having a respective variable delay different from the delays of the other delayed replicas in the plurality.

5. The method of claim 1, comprising:
    associating with said signal a carrier frequency with a given period; and
    varying a period of said time variable dynamic delay from zero to a value lower than or equal to a period of said carrier frequency.

6. The method of claim 1, further comprising varying said time variable dynamic delay with a linear law over time.

7. The method of claim 1, further comprising varying said time variable dynamic delay with a sinusoidal law over time.

8. The method of claim 1, further comprising varying said time variable dynamic delay in a range between tenths of nanoseconds and units of nanoseconds.

9. The method of claim 1, further comprising generating said time variable dynamic delay by providing a cascade of elementary delay units and selectively varying the number of elementary delay units included in the cascade.

10. The method of claim 9, further comprising:
    providing a tapped delay line comprising elementary delay units in a cascaded arrangement; and
    selectively contacting the tap points in said tapped delay line via a switch, whereby changing the position of the switch changes the value of the delay.

11. The method of claim 1, further comprising generating said time varying dynamic delay by providing a plurality of delay elements having respective delay values and selecting at least one delay element out of said plurality.

12. The method of claim 11, further comprising providing at least two switches for contacting said plurality of delay elements and controlling at least two switches in a coordinated manner, whereby changing the position of said at least two switches changes the value of the delay.

13. The method of claim 1, further comprising varying said time variable dynamic delay continuously.

14. The method of claim 13, further comprising varying said time variable dynamic delay continuously by means of a coplanar waveguide having associated therewith a piezoelectric transducer whose perturbations vary the effective dielectric constant of the coplanar waveguide.

15. The method of claim 1, further comprising associating respective variable delays both with said signal and with said at least one replica, wherein said respective variable delays are different from each other.

16. The method of claim 1, further comprising associating respective variable delays both with said signal and with a plurality of variably-delayed replicas thereof, wherein said respective variable delays differ among the respective variable delays.

17. The method of claim 1, comprising:
    generating at least one first delayed replica of said signal subject to a varying delay;
    generating at least one second delayed replica of said signal subject to a fixed delay; and
    transmitting said signal and said at least one first and second delayed replicas via diversity antennas.

18. The method of claim 17, further comprising:
    generating at least one third delayed replica of said signal subject to a fixed plus a further varying delay; and
    transmitting said signal and said at least one first, second and third delayed replicas via diversity antennas.

19. The method of claim 18, wherein further varying delay is different from said varying delay.

20. The method of claim 18, wherein in said signal having a given chip period:
    said fixed delay is greater than the chip period of said signal.

21. In a wireless telecommunication system, which provides communication services to a plurality of mobile terminals, an apparatus for transmitting a signal via diversity antennas comprising:
    at least one delay element for generating at least one delayed replica of said signal subject to a time variable dynamic delay, said signal and said at least one delayed replica to be transmitted via said diversity antennas; and
    a control unit of said at least one delay element for varying, during transmission of the signal, said time variable dynamic delay independently of said transmitted signal and said transmitted at least one delayed replica, according to a varying delay function, whereby said signal and said at least one delayed replica transmitted via said diversity antennas, give rise to alternate constructive and destructive combinations therebetween.

22. The apparatus of claim 21, comprising:
    a splitter for splitting said signal to generate at least one replica of said signal; and
    at least one variable delay element for subjecting said at least one replica to a variable delay to produce said at least one delayed replica.

23. The apparatus of claim 21, comprising one variable delay element for generating one delayed replica of said signal.

24. The apparatus of claim 21, comprising:
    a splitter for splitting said signal to generate a plurality of replicas of said signal; and a plurality of variable delay elements to produce a plurality of delayed replicas of said signal, each replica of said plurality having a respective variable delay different from the delays of the other replicas in the plurality.

25. The apparatus of claim 21, comprising:
an RF stage for associating with said signal a carrier frequency with a given period, wherein said at least one delay element is configured for varying a period of said time variable dynamic delay from zero to about a period of said carrier frequency.

26. The apparatus of claim 21, wherein said at least one delay element is configured for varying said time variable dynamic delay with a linear law over time.

27. The apparatus of claim 21, wherein at least one delay element is configured for varying said time variable dynamic delay with a sinusoidal law over time.

28. The apparatus of claim 21, wherein said at least one delay element is configured for varying said time variable dynamic delay between tenths of nanoseconds and units of nanoseconds.

29. The apparatus of claim 21, wherein said at least one delay element comprises a cascade of elementary delay units and a selector for selectively varying the number of elementary delay units included in the cascade.

30. The apparatus of claim 29, comprising:
a tapped delay line comprising elementary delay units in a cascaded arrangement, and
a switch for selectively contacting the tap points in said tapped delay line, whereby changing the position of the switch changes the value of the delay.

31. The apparatus of claim 21, wherein said at least one delay element comprises a plurality of delay elements having respective delay values and at least one selector configured for selecting at least one delay element out of said plurality.

32. The apparatus of claim 31, wherein said at least one delay element comprises at least two switches for contacting said plurality of delay elements and a controller for controlling said at least two switches in a coordinated manner, whereby changing the position of said at least two switches changes the value of the delay.

33. The apparatus of claim 21, wherein said at least one delay element is configured for varying said time variable dynamic delay continuously.

34. The apparatus of claim 33, comprising a coplanar waveguide having associated therewith a piezoelectric transducer whose perturbations vary the effective dielectric constant of the coplanar waveguide, thus varying said time variable dynamic delay continuously.

35. The apparatus of claim 21, comprising respective variable delay elements configured for applying respective variable delays both to said signal and to said at least one replica, wherein said respective variable delays are different from each other.

36. The apparatus of claim 21, comprising respective variable delay elements configured for applying respective variable delays both to said signal and to a plurality of replicas thereof, wherein said respective variable delays differ among the respective variable delays.

37. The apparatus of claim 36, comprising:
at least one first delay element configured for generating at least one first delayed replica of said signal subject to a varying delay; and
at least one second delay element configured for generating at least one second delayed replica of said signal subject to a fixed delay, said at least one first and second delayed replicas being adapted to be transmitted together with said signal via said diversity antennas.

38. The apparatus of claim 37, comprising at least one third delay element configured for generating at least one third delayed replica of said signal subject to a fixed plus a further varying delay, said at least one third delayed replica being adapted to be transmitted together with said signal and said first and second delayed replicas via said diversity antennas.

39. The apparatus of claim 38, wherein said further varying delay is different from said varying delay.

40. The apparatus of claim 38, wherein in said signal having a given chip period said further varying delay is identical to said varying delay and said fixed delay is greater than the chip period of said signal.

41. A communication network comprising at least one communication equipment equipped with diversity transmission antennas, said at least one communication equipment comprising an apparatus for transmitting a signal via diversity antennas comprising:
at least one delay element for generating at least one delayed replica of said signal subject to a time variable dynamic delay, said signal and said at least one delayed replica to be transmitted via said diversity antennas; and
a control unit of said at least one delay element for varying, during transmission of the signal, said time variable dynamic delay independently of said transmitted signal and said transmitted at least one delayed replica, according to a varying delay function, whereby said signal and said at least one delayed replica transmitted via said diversity antennas, give rise to alternate constructive and destructive combinations therebetween.

42. The communication network of claim 41, wherein the communication network comprises a mobile communication network.

43. The network of claim 42, wherein said at least one communication equipment is selected from the group of a radio base station, a repeater and a mobile terminal of said mobile communication network.

44. A communication equipment equipped with diversity transmission antennas and comprising an apparatus for transmitting a signal via diversity antennas comprising:
at least one delay element for generating at least one delayed replica of said signal subject to a time variable dynamic delay, said signal and said at least one delayed replica to be transmitted via said diversity antennas; and
a control unit of said at least one delay element for varying, during transmission of the signal, said time variable dynamic delay independently of said transmitted signal and said transmitted at least one delayed replica, according to a varying delay function, whereby said signal and said at least one delayed replica transmitted via said diversity antennas, give rise to alternate constructive and destructive combinations therebetween.

45. A tangible computer-readable medium containing instructions that, when executed by a computer, perform a method for transmitting a signal via diversity antennas, the method comprising:
generating at least one replica of said signal;
introducing time variable dynamic delay on said at least one replica;
transmitting said signal and said at least one delayed replica via diversity antennas; and
varying, during transmission of the signal, said time variable dynamic delay independently of said transmitted signal and said transmitted at least one delayed replica, according to a varying delay function, whereby said signal and said at least one delayed replica transmitted via said diversity antennas, give rise to alternate constructive and destructive combinations therebetween.

* * * * *